United States Patent [19]

Polcyn et al.

[11] Patent Number: 5,311,588
[45] Date of Patent: May 10, 1994

[54] CALL PROGRESS DETECTION CIRCUITRY AND METHOD

[75] Inventors: Michael J. Polcyn, Allen; Ellis K. Cave, Garland; Howard S. Barnett, Dallas, all of Tex.

[73] Assignee: InterVoice, Inc., Dallas, Tex.

[21] Appl. No.: 91,467

[22] Filed: Jul. 13, 1993

Related U.S. Application Data

[63] Continuation of Ser. No. 657,530, Feb. 19, 1991, abandoned.

[51] Int. Cl.⁵ ............................................. H04M 1/00
[52] U.S. Cl. ................................... 370/377; 379/386; 379/382
[58] Field of Search ............... 379/386, 257, 377, 258, 379/265, 266, 382, 252

[56] References Cited

U.S. PATENT DOCUMENTS

| | | | |
|---|---|---|---|
| 4,405,833 | 9/1983 | Cave et al. | 379/372 X |
| 4,439,639 | 3/1984 | Munter | 379/386 |
| 4,620,066 | 10/1986 | Bushnell et al. | 379/266 X |
| 4,696,031 | 9/1987 | Freudberg et al. | 379/386 |
| 4,734,933 | 3/1988 | Barsellotti et al. | 379/382 |
| 4,742,536 | 3/1988 | Dewater et al. | 379/382 |
| 4,864,605 | 9/1989 | Ramsay et al. | 379/382 |
| 4,979,214 | 12/1990 | Hamilton | 379/386 X |
| 5,070,526 | 12/1991 | Richmond et al. | 379/386 X |

FOREIGN PATENT DOCUMENTS

0144949  7/1986  Japan ................................... 379/382

Primary Examiner—James L. Dwyer
Assistant Examiner—M. N. Shehata
Attorney, Agent, or Firm—Winstead Sechrest & Minick

[57] ABSTRACT

There is disclosed a method and system for determining the progress of a calling connection. The system measures the peak voltage of the signals on the line and derives a ratio of these peak signals to the average value of the signal. From this ratio a determination is made as to the calling condition of the line.

58 Claims, 3 Drawing Sheets

CALL PROGRESS DETECTION CIRCUITRY AND METHOD

This is a continuation of copending application(s) Ser. No. 07/657,530, filed on Feb. 19, 1991 now abandoned.

TECHNICAL FIELD OF THE INVENTION

This invention relates to a communication system call progress system and method and more particularly to such a system and method using peak to average ratios of the signal for detection purposes.

BACKGROUND OF THE INVENTION

In modern communication technology it is becoming increasingly more important to be able to electronically detect the progress of a calling connection. One reason this is important is so that in automatic systems, particularly predictive dialing systems such as disclosed in concurrently filed copending patent application assigned to a common assignee, which patent is hereby incorporated by reference herein, the system is able to ascertain the status of any calling connection with a high degree of certainty.

It is not acceptable just to know that the call has not been answered, but the value of such a system lies in its ability to distinguish between no answer, busy, a dedicated computer or fax line, operator intercept, modems, etc. By knowing this information, the calling system can make determinations about future calls. For example, if a fax machine answers a call, there is no point in leaving a voice message or in retrying that call to that number. On the other hand, if a busy condition is detected, a call can be retried sooner than it would be if a no-answer condition were to be found.

Typically, the prior art in one form or another detects the envelope of the call progress signals. These envelopes are a result of the dual tones which are used for creating the various call progress audio signals. Such a system, however, does not work well in all countries, particularly where the telephone systems do not have standard tones which define the call progress signals.

In addition to the problem encountered where there are no signal envelopes, the prior art systems do not handle the situation where there is an answer by an attendant or by a fax machine or computer.

Another prior art method of determining call progress is to measure the on and off times of the audio signals, and from the change in cadence of these signals, deduce that a call has been answered. Again, this system cannot discriminate between answering machines, fax equipment, etc.

Accordingly, there exists in the art a need for systems and methods of determining the progress of calling connections without resort to signal timing or signal envelope detection.

SUMMARY OF THE INVENTION

In order to detect the progress of telephone calling connections, we take advantage of a technique called peak to average signal ratios (PAR) determination. By analyzing the PAR and from knowing certain other characteristics of the call progress signals, it is possible to ascertain whether the connection has been answered by a human voice, a machine, or busy, or other signals are on the line.

This technique is coupled with a sliding window in which the measurements are made. This has the advantage of determining when the signal changes or its transition. A further advantage of this system is that the determination of what type of signal is on the line needs to be evaluated only at the transition time.

There are two predominant features that are important in determining call progress. The first is to determine that a transition has occurred on the line, i.e., tone to silence, silence to somebody talking, etc. The second is to be able to classify the detected change. Transition detectors are used to determine when the change occurs, and then other methodology is used to determine what kind of change occurred. One type of methodology used for determining "what" occurred is a repeat methodology. A machine repeatable sound, for instance a tone, will repeat itself over a period of time. By so repeating, the tone maintains the same peak to average and the same power. The results of the peak/average and the power are sampled and resampled, on a periodic basis, and if they are close, it can be assumed that it is a machine repeatable tone.

Another essential feature of this invention is determining the difference between noise and a voice. In this aspect, it is assumed that voice over a short period will change faster than noise, and thus, if the PEAK/MAX remains constant, it is assumed that the tone is non-voice.

Thus, it is an advantage of our system and method that peak to average signal ratios are compared to other known factors and are also taken at various points in time to build a particular profile of the call progress signals. From this profile, a call progress determination can be accurately ascertained, all without regard to signal envelope measurements.

BRIEF DESCRIPTION OF THE DRAWINGS

The foregoing objects, features and technical advantages, as well as others, of the invention will be more apparent from the following description of the drawings in which.

DETAILED DESCRIPTION OF THE INVENTION

Before beginning a discussion of the predictive algorithm, it might be helpful to understand the context in which the algorithm is to be used. This is best illustrated from a review of FIG. 5 in which telephone trunks 501 from a telephone exchange (not shown) extend through telephone switch 56 in a conventional way and via telephone lines 502 to telephone stations (not shown), which are utilized by agents. Each of these agents also has a keypad and computer input terminal connected to a computer (not shown), which communicates with computer 57 and provides computer 57 with a list of telephone numbers which are to be called throughout the course of a given time period. Call control computer 57 then places calls through telephone switch 56 by first establishing the call via use of call placement and call progress determination circuit 58.

Figure 5:
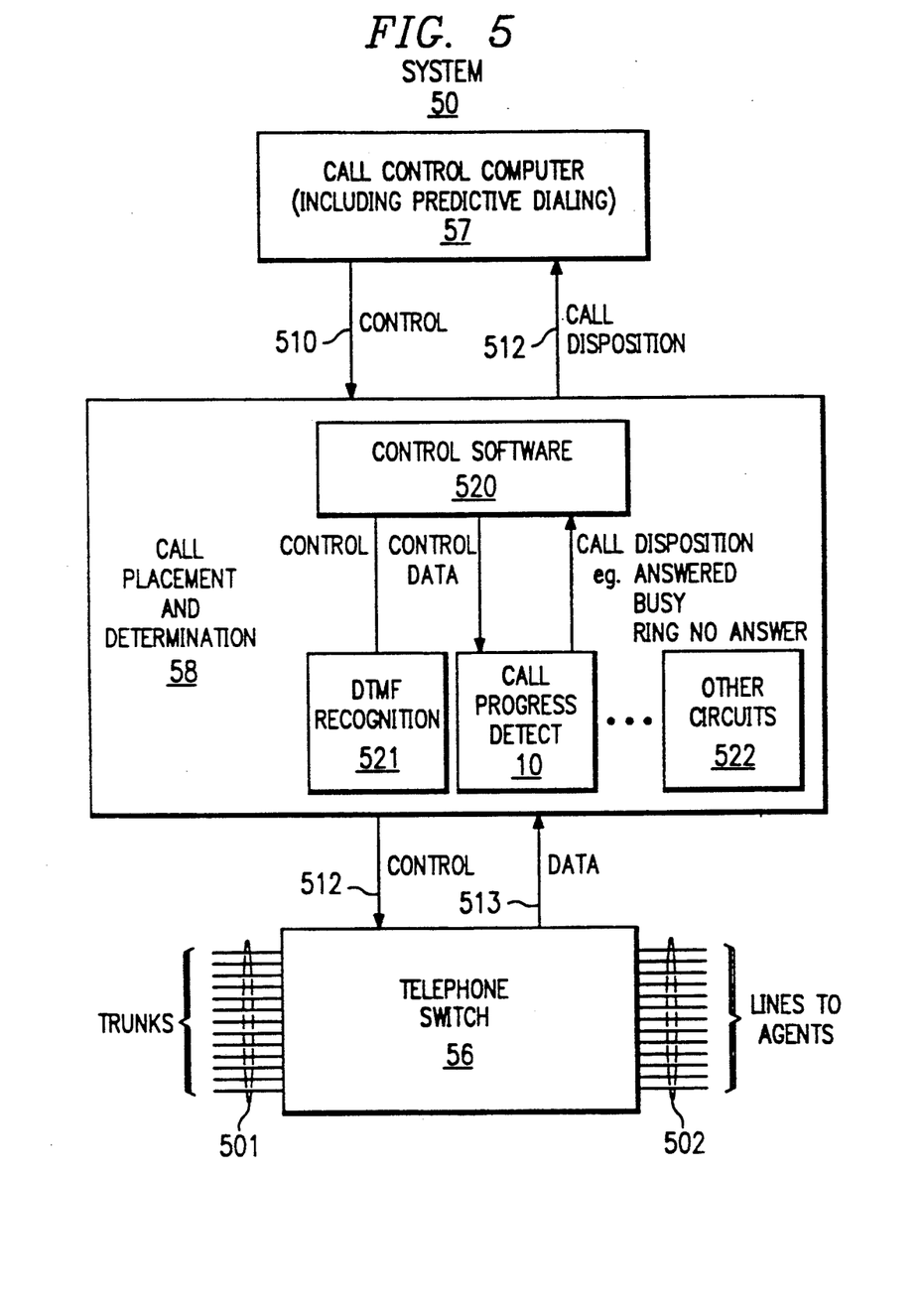
FIG. 5 shows a typical system using the invention.

The system works such that circuit 58 dials a call over one of the trunks 501 and monitors the progress of the call via lines 513 to determine whether the call has been answered, a busy signal has been returned or a no-answer situation exists. Upon determination of an answer, that information is communicated (either through switch 56 or via a direct bus connection) to call control computer 57 which in turn monitors which agent is then available. Computer 57 then controls telephone switch 56 to complete a connection from the active trunk 501 over a selected line 502 to a selected agent. Call control computer 57 then transmits information to the active terminal indicating the identity of the called party. At the same time the terminal communicates this information to the main computer which then accesses its data base and provides the block of data to the appropriate agent operating in this respect in the inquiry mode.

System 50 then operates to automatically place calls to called parties and must do so in a manner such that when the calls are answered, an attendant is available. The efficiency with which call control computer 57 performs its function determines the efficiency and thus the profitability of system 50.

Continuing with FIG. 5, call control computer 57 controls the call placement and call determination algorithms that are resident in call placement unit 58 within a DSP. Within the DSP is control software 520, which controls various subroutines and latches in the subroutines that are needed in order to perform its function, such as DTMF recognition 521 or call progress detection 10. When the call control software wishes to set up a telephone call and do call progress detection, it would control switch 56 to set up the telephone call and receive the PCM data from trunk lines 501. It would then route that data into call progress detect algorithm 10 while controlling the algorithm by defining what type of detection is required. When call progress detection algorithm 10 determined the call disposition, that is, whether the call had been answered or is busy, or is a ring, no answer, etc., it would respond to the control software with the appropriate code. The control software would then pass that control code to the control computer for disposition.

As discussed above, outbound call progress monitors the line after a call has been dialed and reports to the higher level when the call has been answered. Since many calls are terminated without a human answering the call, output call progress detects and reports results of other line conditions. The program will return a result if it detects a busy, reorder, SIT, modem or fax. If the call is not answered in a specified time, or the call was not properly routed, the program will return a ring-no-answer status, a line-dead status, or a line-dead after-first-ringback status.

Outbound call progress is a function that runs in the AT&T signal processing chip in the VCD. The call progress function is designed to monitor multiple channels of PCM audio data concurrently. To access outbound call progress, the system arms call progress by a call to call_arm. This allows call progress to initialize its variable memory. The main program makes subsequent calls to call progress every 15 milliseconds. When the main program calls the call progress routine, a sample buffer containing 15 milliseconds of data (120 samples) is passed to the call progress routine. This data passed is referred to as the "sample buffer" in this document.

Call progress needs to examine several of these sample buffers simultaneously. When a sample buffer is received, call progress attaches it to a buffer information structure. As more information is processed about this buffer, the results are added into the buffer information for that sample buffer. Call progress may use up to four sample buffers simultaneously.

Outbound call progress contains a layered approach to call discrimination. Each level uses information from the levels below and refines this information for the next level.

Figure 1:
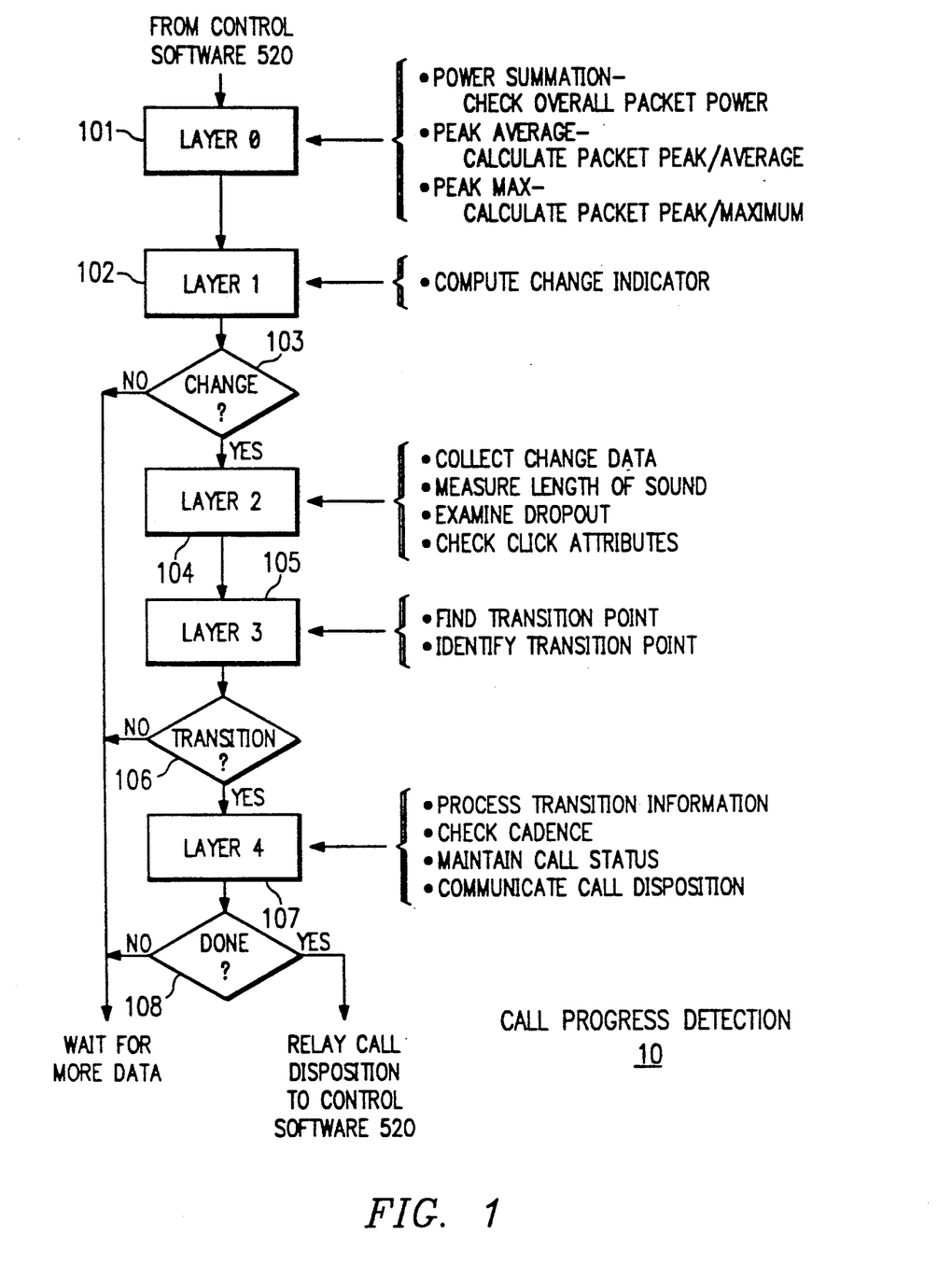
FIG. 1 is a flow chart showing one arrangement of an algorithm for controlling the system.

As shown in FIG. 1, the lowest level, layer 0, records the power of the signal. If the power of the signal collected in a sample buffer is large enough (greater than −50 dbm) to be considered a signal on the line, other attributes such as the peak average, and the maximum positive and negative voltages are recorded.

The next layer, layer 1, uses the layer 0 factors to determine transitions in the signal. This change may be from silence to signal or may be from one type of signal to another.

When the change indicator from layer 1 shows a change, or if the level above requests more data, layer 2 performs more transition operations. These measure the click attributes of the signal as well as the consistency of the signal with time.

Layer 3 identifies the type of signal that has caused the transition. Layer 3 evaluates information from the lower layers. Layer 3 must determine whether or not the signal is machine repeatable (defined as a signal that is relatively constant in power and number of frequencies with time). If the signal was machine repeatable, layer 3 categorized the signal as a single tone, dual tone or "rbtone" (more than two tones). If the signal was not machine generated, layer 3 must classify the signal as a voice, click, or noise. If the signal type can be determined with high probability, layer 3 sends that information to layer 4; otherwise, layer 3 will wait for more information. Layer 3 will continue to evaluate and wait until the signal can be determined with a high probability of accuracy, or the signal is going away forcing a "best guess" response to the signal.

Layer 4 receives information when layer 3 determines the type of transition that has been made. This information is processed to evaluate the call progress. Cadences are measured to determine if a busy, ring or reorder cadence exists or if a ring cadence has been broken. Once layer 4 determines the disposition of the call, the routine passes that information to the main routine which in turn informs the calling routine.

Layer 2, layer 3 and layer 4 are event-driven layers. They only act upon data if there is a change in the signal. However, part of the function of layer 4 must be time-driven. The time-driven logic (located in CP_MAIN) is responsible for recognizing events that may need to be triggered although there has been no change in that signal. The most obvious of these timing events deals with the dead-air time-out. The main routine monitors the time from enable. If a specified amount of time has elapsed before the first call progress sound is heard, the routine terminates call progress. Other conditions that are monitored at this level are 1) the amount of time the telephone is ringing and 2) the amount of silence from the last call progress tone.

Module Breakdown

When the call progress is first called by the control software, it is initialized using CP_ARM, and is called using the call subroutine, which sets up all the initial variables, and thus initializes the call progress algorithms. The parameters initialized in CP_ARM would define the amount of time in the ring, no-answer responses, and exactly where the data is coming from. This allows the call progress detection algorithms to initialize the memory and data to know that it is starting a new detection algorithm. Subsequent calls from the main program would go to CP_MAIN. CP_MAIN would then direct the data, when required, to perform the layer 0, 1, 2, 3 or 4 actions in the program.

| | |
|---|---|
| CP_ARM | Initialize call progress. |
| CP_MAIN | Perform layers 0-4 of call progress. Report result to calling program. |

Within each of the layers of the algorithm, there are subroutines which have been given various titles, which subroutines are listed below, and will be discussed in detail hereinafter.

| | |
|---|---|
| layer 0 | |
| CP_POWER | Check the Power of the signal |
| CP_PEAK | Check the Peak Average of the signal. |
| pk_max | Compute the Peak Maximum Change |
| layer 1 | |
| CP_CHG | Check for Change in Signal |
| layer 2 | |
| CP_LAY2 | Perform layer 2 operations |
| CP_CLICK | Check Click attribute |
| layer 3 | |
| CP_LAY3 | Perform layer 3 Operations |
| CP_SIT | Evaluate factor in SIT Mode |
| CP_GOER4 | Process Goertzel filters for SIT mode |
| CP_VNTST | Test signal identification |
| CP_VCN | Test 45 millisecond window for voice or noise |
| CP_VCN15 | Test 15 millisecond window for voice or noise |
| layer 4 | |
| CP_LAY4 | Perform layer 4 operations |
| CP_CAD | Test cadence, processing |
| CP_ARM Arm Call Progress | |
| Goal: | Initialize one channel for call progress |
| Methodology: | CP_ARM clears initializes channel dependent variables. |
| | The routine performs the following functions: |
| | Initialize channel dependent state variables to known states. |
| | Loads channel dependent parameters. |
| | Initializes pointers to transfer buffers. |
| Inputs: | |
| | RNA time-out (16 bits) in 15 millisecond units. |
| | mode information (16 bits) |
| | Pointer to channel dependent buffer information area. |
| | Pointer to channel dependent memory. |
| CP_MAIN Call Progress Main Loop | |
| Goal: | The main routine receives information from the calling routine, routes that information to specific subroutines and responds to the calling routine with status information. The main routine must be able to check the state of call progress as well as keep track of the progression of each sample interval through the algorithm in order to determine when routines must be executed. CP_MAIN also checks critical time-out factors and forces system state changes if these factors are exceeded. |
| Methodology: | The main routine will determine if there is enough data stored to execute a routine within a particular layer. The main routine keeps track of the progress of a sample buffer. When a computation such as peak/average has been performed for the sample buffer, the main routine changes the state of the sample buffer to reflect the |

-continued action. The main routine allows elasticity in the buffering schemes by routing samples to the routines needed, or bypassing routines that are not needed and noting the state progress. The buffer that is waiting for a routine is examined on each call to CP_MAIN in order to determine if the buffer has enough information (either previous calculations, or sample buffers following this buffer) to proceed with the level. This action lets buffers queue at the necessary level during signals of interest and then clear after the signal has been evaluated. For example, layer 2 needs the first sample buffer ready to process level 2 information and the preceding sample buffers at least process ready to change information. If there is no power dropout, then level 2 also needs the sample buffer following to be ready to process change information.
Each level is processed independently by using pointers to the next available sample buffer information for that level as well as level status information contained in the buffer information. This allows buffers to back up and clear as required by each layer of the program.
Rules for calling subroutines:
Layer 0: Always call power check routine with sample buffer before calling peak/average and peak/maximum if a silence to power transition is determined by the peak average routine.
Layer 1: Call Change Routine if three sample buffers have passed layer 0.
Layer 2: Call if one sample buffer is ready to process at the level 2 state and the two subsequent buffers are ready for processing at the level 1 state or have no energy. Record information if the change was significant, the time has gone off or the last transition was noise of the type close to voice.
Layer 3: Process if change is significant or timer has gone off to force processing, or last transition was noise, of the type close to voice.
Layer 4: Process if layer 3 determines that a transition has occurred.
Layer 4 provides the main call progress detection logic. The job of each layer before layer 4 is to filter and refine the line signal information for layer 4, so that state information of the call can be evaluated. Layer 4 processes changes of state only. There are some functions that could be considered upper level functions that must be independent of transitions. The following functions are handled in the CP_MAIN program.
Start Time-out - Time-out before first mechanically generated tone detected.
RNA Time-out - Time-out for rings, until called party determined not to be at home.
Silence Time-out - Changes layer 4 from ring state to post ring state after not detecting a mechanically generated tone for a period of time.
PRB Time-out - Time-out after ring cadence stops, until we consider that we missed called party or line is dead.
Since main routine communicates with the calling routine, it must send back the first ringback message as well as the call disposition message. The routine responds with a first ringback message; when the layer 4 state changes from "acquire ringback" to another state. The routine returns call disposition when layer 4 state changes to "done". Layer 4 state changes

|  |  |
|---|---|
| | occur within layer 4 or the main program may change layer 4 state if the above state time-outs have occurred. |
| Inputs: | Pointer to SAMPLE Data (120 samples) Pointer to channel dependent memory |
| Returns: | Cadence occurred (0×c0 yes / 0 no) Call Disposition Time stamp |
| CP_POWER | Calculate Power Factors |
| Goal: | This routine checks for power transitions from sound to no sound. The routine stores total power, peak power, maximum positive voltage, and maximum negative voltage for the sample buffer. |
| Methodology: | If the subroutine is looking for the start of power, the routine looks forward in the buffer. If the routine is looking for the stop of power the routine looks backwards through memory. As the routine examines each sample in the sample buffer, it saves the peak instantaneous power (and the location of that peak). The routine looks for the start or stop of power by looking at the power contained in a sliding window of 30 samples. (The window moves on 15 sample boundaries). The purpose of looking at the average power in 30 samples is to eliminate false triggering of start or end based on one or two samples. |
| Items added to buffer information by this routine: | Total power in sound portion of sample buffer Total power in sample buffer Peak power in sample buffer Peak positive voltage Length of sound portion of sample buffer Start of sound portion of sample buffer Offset of peak power Peak positive of last 3 sample buffers Peak negative of last 3 sample buffers Peak negative voltage 0 - No power 2 - Power lost in this sample buffer 6 - Power restored (went away last buffer) interval less than 120 samples 7 - Power restored (went away last buffer) 8 - No power to power 10 - Power |
| CP_PKAV | Compute Peak To Average Ratio |
| Goal: | Compute the Peak/Average factors relevant for this sample buffer. |
| Methodology: | The peak/average is defined as the peak instantaneous power for a time interval divided by the average instantaneous power for that period. This is: peak power divided by the average total power. Three peak averages are used in later calculations: The peak average for 1 sample buffer. The peak/average for two sample buffers (the current sample buffer and the previous sample buffer), and the peak average for three sample buffers (the current and the previous two sample buffers). The subroutine will compute the peak average only if the power check routine determines there is enough power in the sample buffer. The power check routine computes the peak power value for this sample buffer as well as the power in the sample buffer. If third is a silence to noise transition in this buffer, and the transition from silence to noise had occurred near the end of the sample buffer, the peak average routine uses data from the next buffer to fill the peak average out. The peak average then uses saved data (peak power, total power and length) from the last two sample buffers to calculate the two and three buffer peak averages. During the calculation, peak average calculates the difference of these three factors from one buffer to the next, since the differences are used as indicators of change in signal types. This saves later computation. |
| Items added to buffer information: | Last Sample buffer length Last Sample buffer total average power Last sample buffer peak power Sample buffer average power for pkav calculation Total power for last 3 sample buffers Sample buffer peak average Peak average over three sample buffers Current peak power value Last sample buffer peak average Change in one sample buffer peak average Change in two sample buffer peak average Change in three sample buffer peak average |
| CP_PKMAX | Compute Peak Maximum Change This routine determines the maximum change in peak value that has occurred in this sample buffer (max) and determines the peak/max ratio (or more appropriately the max/peak ratio) by dividing the max change by 2 times the peak. Dmax is the change in peak max ratio from the previous sample buffer to the present sample buffer. |
| Output: | PK3MAX - sum of last 3 changes in PKMAX from one sample buffer to another. If going from no sound to sound, pkmax is weighted for the number of sound samples. |
| CP_CHG | Detect Change in Call progress |
| Goal: | To determine if a significant transition has occurred. The output of the routine rates the significance and direction of the change. |
| Background: | This routine uses the peak/average ratio computed in CP_PKAV to measure the change of a signal. Peak/Average is volume and frequency independent. It is a measure of the number of pure tones in a signal. A sine wave has a peak/average of two, two summed sine waves have a PKAV of 4, etc. If the amount of power per peak volt contained in a signal is envisioned as the density of signal, the change indicator detects a change in density of the signal. This makes the fundamental change detector sensitive to changes such as a signal going from two tones to three tones and not sensitive to changes in volume or frequency. |
| Methodology: | The detector looks at the sliding window of peak averages before and after the point of interest. The detector looks at: the pkav of the sample buffer before; the two sample buffers preceding; and the three sample buffers preceding to see if there is a forward transition. The detector then looks at: the sample buffer following; two sample buffers following; and three sample buffers following to see if there is a back transition. If all factors in either of two sets of indicators move in the same direction at the same time, a transition occurs. A transition is considered significant if the factors move in order (e.g. the change of one is less than the change of two which is less than the change of three) and that the least change be significant (> 1) or the biggest factors moves in a significant way (> 3). A transition is also considered significant if |

Figure 2:
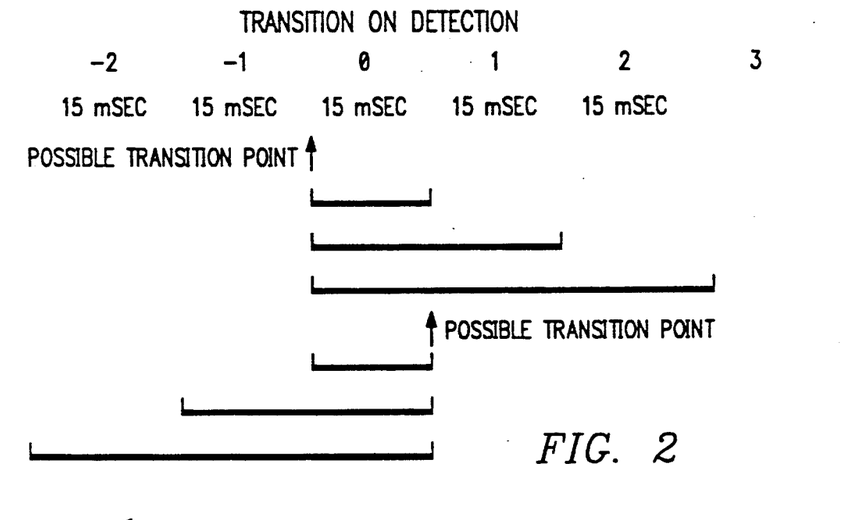
FIG. 2 shows the sliding time frames for determining transitions.

-continued all factors change in a very significant manner (> 4) regardless of order. This methodology will be discussed with respect to FIG. 2 which shows the transition detection. The purpose of CP_CHG is to detect transitions. Other parts of the program identify what the signal is at the transition point. CP_CHG determines when the signal changes on the line, that is when a click comes on the line with respect to a tone, if that click is inside the tone such as a click that would occur inside of a ring-back tone. The program examines 15 millisecond windows. It stored information on the 15 milliseconds in time behind that and the one behind that, and also two 15 millisecond increments ahead of that. The program processes the data at a latency of about 45 to 60 milliseconds from the time the sample is acquired in order to get the actual time that is ahead.
In order to determine that there is a transition ahead of us, the program looks at the current bucket of information, the current 15 milliseconds; it also examines the current information plus the next one, or 30 milliseconds of time, and the current bucket plus the next two or 45 milliseconds of time. The program examines the peak average indicators computed in layer 0. If all three change in the same direction in ascending or descending magnitude and the change from the 15 milliseconds PAR is smaller than the 30 milliseconds PAR, which is smaller than the 45 millisecond PAR, then a transition occurs. On the other hand, if all indicators have a very high change in peak average, then the program determines a change occurred.
The program examines same factors looking backward. It examines the current 15 millisecond window, and the preceding 30 millisecond window, and the preceding 45 millisecond window. If all PAR factors changed either a great deal, or if they have changed in order, then a change occurred at that point. If either check determines there is a transition or there is a change in gross volume, the next levels of the program must determine what signal is present at the time of change.
The spacing, the 15–45 milliseconds, was derived to be short enough to catch transitions such as DTMF which can occur on a 50 millisecond basis and also short enough to catch smaller transitions and dropouts between voice utterances. The time had to be long enough so that the beat frequency from a dual tone signal such as precision ringback will not cause many false transitions.
Changes are graded with respect to the likelihood of a transition:
Change based on change in power;
Change based on move from silence to noise or noise to silence;
Big peak to average change > 4.0;
Peak to average change with increased volume;
Peak to average change with decreased volume;
Small change but 1 factor significant;
Silence to noise with short dropout;
Small change in PKAV < 1.7; and
No change CP_LAY2 Process Layer 2
Goal: This layer initializes and builds a transition buffer. The transition buffer has information relevant to the transition. CP_LAY2 collects relevant information within the sample buffer information at the transition and stores this information into the transition buffer. CP_LAY2 also computes some information for that transition buffer.
Methodology: Move relevant factors from the buffer information to the current transition buffer.
Calculates length of signal by looking ahead at power factors.
Calls click routine if relevant.

CP_CLICK Click Detector
Goals: Determine if the current transition is a click. The routine returns a click attribute, which is a measure of the impulse attribute in the transition.
Methodology: The routine looks for a sharp rise in peak/average and volume followed by a sharp decline in volume and an underlying frequency of less than 400 hz. The routine examines this sample buffer and the next when finding the peak value to use in the calculations.
Click Return Values: The following table lists the return values from the click routine, which values rate the click attribute of the signal. Set out below are the results of checks done on the signal to measure the click attribute.
The routine stores this number in i_clickst.
1 - Got to this routine but not a change (chst) based on power or a big peak to average change (CHG_PWR,CHG_SH,CHG_BIG)
2 - peak volume < −25dbm or new peak/average not greater than 5 times last peak/average.
3 - There is no decline in the peak volume over the next three sample buffers.
4 - Power does not rapidly decline over the next three sample buffers.
5 - The zero crossing count of the signal after the peak in this buffer (or the next buffer if that peak is at least 80% of this peak) is more than 9 during the next 150 samples.
9 - CLICK: Not rejected on criteria 1–5
10 - POWER CLICK: Not rejected on criteria 1, 2 or 3 and > −3dbm in power.
A return value of 5 or greater has a large click attribute. Values of 5 occur if the click is obscured in another signal.
Decline in peak volume is determined if the peak volume in the third sample buffer (buffer + 2) is less than 75% of the peak volume of this sample buffer or the next sample buffer or if the power check routine shows a dropout during the next two sample buffers.
A rapid decline in power is where the next sample buffer has half the power of this buffer and the buffer following has half the power of the next sample buffer, or power check routine detects power dropout.
Returns: Click Status.

Figure 3:
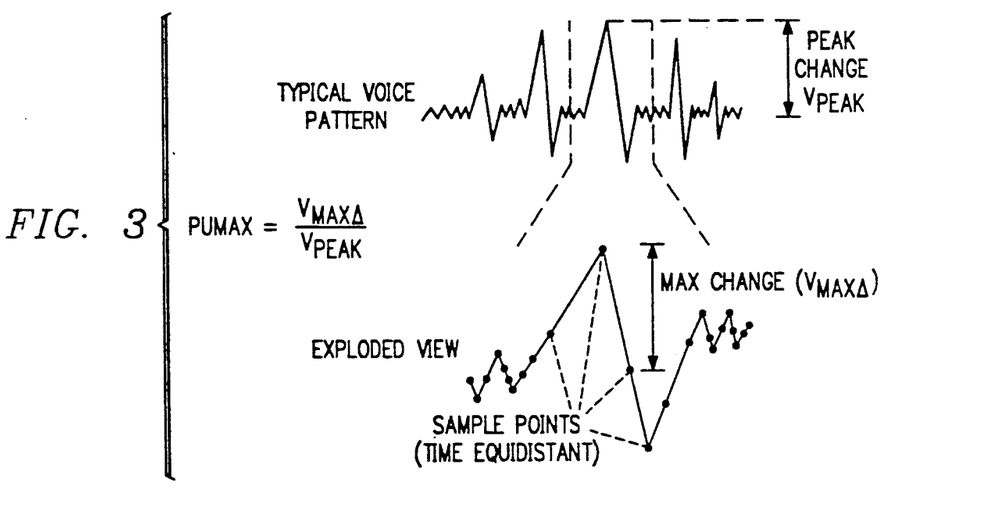
FIG. 3 shows a graph of a typical voice energy level.

CP_LAY3 Process Layer 3
Goal: The goal of layer 3 is to classify a transition, build the proper transfer buffers, and report the transition to layer 4.
Methodology: Layer 3 looks at the incoming signal and evaluates the signal to determine the type of transition. The following list shows all transition types sent from layer 3 to layer 4. Layer 3 also has special states to relay information to layer 4 regardless of transition classification. This state is used in cases such as SIT tone processing to help locate the changes in tone.
If the transition is not classified as "silence" or "click", the transition must be evaluated to see if it is a mechanical sound, noise or voice. A signal is classified by measuring specific factors, those being the peak/average and the power at the time of transition, then waiting and trying again some fixed time (45msec) later. The factors are compared to one another to determine if a significant change has taken place. There are three results from the comparison.
1) The comparison is sufficiently close enough to call the signals machine repeatable.
2) The comparison is sufficiently far enough off to categorize the signals as not machine repeatable. Further tests are then done to determine if the signal is voice or noise. These tests are based on certain ratios as shown in FIG. 3. Voice has a sub-envelope 30 within another envelope 31 and looks like a skeleton. In contrast, noise is relatively steady in power level, frequency, volume. Accordingly, instead of taking the peak average, the program uses the peak power versus the maximum delta change. The program looks at the changes of peak max with time. Noise, though it is random, has some repeatability. With voice, information is being put out so it is changing. Noise will basically have the same peak max, where voice will vary the peak max.
3) They might be close enough to be machine generated. The program should delay and retry.

Layer 3 Transitions
Silence
Click, determined by: drop-off in frequency and volume; or very high peak volume.
Click: Determined by a very short noise on the line with some click attributes.
Single tone
Dual tone
A machine repeatable tone, more than two
A voice
A noise
A short noise, could be a cradle click or noise after a click.

LAYER 3
Layer 3 is constructed like a state machine in order to facilitate processing. The following are the states in the state machine and their functions:

WAIT: Reset Processing. Sets up level 3 factors to understand the start of a call.
SIT: System Intercept Tone Processing. If Layer 4 is looking to time SIT tones, layer 3 is set to SIT mode to allow the goertzels to run. Transitions in this mode are always reported to Layer 4. Layer 4 is responsible for timing and classifying the SIT.
NORM: Normal Transition Processing. If this is a new transition. Layer 3 checks the length. If the length is short, the signal is classified as click or cradle noise. If the signal is long enough, relevant data is saved and the retry counter is triggered to check the signal in 45 milliseconds.
If the retry counter had been set but the transition was significant, a noise transition is reported and the current transition is processed like a new transition.
If the retry counter has been set but the transition was insignificant, tests are made for machine reproducibility. If the signal is machine repeatable, SINGLE or DUAL tones are returned. If the signal is not machine repeatable, the voice noise discriminator is called to determine if the signal is voice or noise.

CP_SIT Process System Intercept Tones
Goal: There are routines in this module that control which goertzels to use when finding the start of SIT or when tracking SIT.
GTFIRST - get first SIT tone. Returns goertzel values valuable to detect start of SIT.
GTT - Get Tri Tone. Runs goertzels when in SIT acquisition state in level 3(L3_SIT).
TESTSIT - Returns indicator for first or second SIT Tone. Keeps low/high indicator on first two sits correct. Used by layer 4 to identify a sit tone during transition.

Methodology: GTFIRST - GTFIRST runs a 60 point goertzel over four frequencies. These filters are centered on the high and low frequency of the first two tones. This is done to detect some SITS that miss the first tone. The power result from the high and low tone of the first SIT are compared. The filter with the greatest volume is checked. If that filter contains 70% of the total power, a positive for that tone is registered. If the first tone is not detected, this procedure is repeated for the second tone.
GTT - GTT runs a 60 point goertzel over four frequencies. These filters are centered on the high and low frequency of either the first two tones or the high and low frequency if the second tone along with the third tone frequency and 1900 hz.
GTT first looks at the present SIT level to decide which goertzel to run. If the level is 1, the first set of coefficients are run, otherwise the second set is run.
GTT checks to see that the next tone exists. If the next tone does not exist, GTT checks to see if the present tone has gone away.
sits - pointer to SIT information outputs: t_slev - current sit level
0 - no find
1 - find on SIT tone 1
2 - find on SIT tone 2
TESTSIT - test sit check the individual goertzel result indicators and returns if the sit is present and which sit tone we are processing.

output: not in sit
in first sit
in second sit tone

VNTST Transition Classification
Goal: Called by layer 3 on retries after transition to determine if the sound is a machine generated sound, a voice or a noise.
Methodology: VNTEST: Checks past transition information with present transition information to determine if a sound is machine generated. If the sound is not machine generated, a test is made to determine if the sound is a voice or a noise.
Criteria for machine generated sound:
Symmetry Factor Calculation (SF):
A factor 0-4 denoting the amount of symmetry in the signal. One point for each of the following calculations:
1) last peak positive within 20% of present peak positive;
2) last peak negative within 20% of present peak negative;
3) last peak positive within 20% of last peak negative;
4) present peak positive within 20% of present peak negative.
A signal is machine repeatable if:
number of retries is 3 or the difference of the peak/average between the last sample buffer and the present buffer is less than 10% of the average peak/average;
and
the difference of the power between the last sample buffer and the present buffer is less -continued than 10% of the average power;
or
the symmetry factor is greater than 2, and
the peak/average and power differences are
within 20% of their respective averages.
The signal is determined to be a single
tone, dual tone or ringback tone based on
its peak average value. A ringback tone is
defined to be a machine repeatable tone of
more than two pure tones.
A retry to recheck 45msec from the present
will be determined if the sf > 1 and either
the peak/average difference is within 10% of
the average peak/average or the power
difference is within 10% of the average
power. Both differences are within 20% if
their respective averages and the try count
is still less than 2.
If these tests fail, there is a test given
to determine if the sound is a voice or a
noise.

CP_VCN Voice Noise Routing
Goal: The primary goal of these routines is to
identify whether a signal on the line
represents a voice or a noise. The
routines, which perform one of the most
difficult tasks in call progress, are called
after it has been determined that the sound
is not machine repeatable or a click.
These routines analyze the 15 millisecond
voice/noise indicators on a 45 millisecond
basis and give a voice or noise indication
based on the readings. The routine calls
CP_VCN15 to get the 15 millisecond
voice/noise indicators.
The main purpose of the voice noise routines
which are VC level or VC noise, is to look
at data and evaluate whether the data is a
voice or a noise. That is done by examining
three sample buffers of data. Each sample
buffer, 15 milliseconds of data, is analyzed
separately. VCN 15 is used to analyze the
voice or noise attributes of each of the
three sample buffers. Several factors are
examined during the voice noise processing:
1) the overall frequency description of the
signal; 2) the FFT of the signal is
analyzed to determine if the frequencies
spectrum are relatively flat or whether they
are concentrated in areas of the spectrum;
3) the peak max as an absolute indicator;
and 4) the change in peak max.
VC_LEVEL - Looks at up to three sample
buffers of data and returns an indication
based on the results of those three.
VC_NOISE - Returns positive if two of three
consecutive readings have voice attributes.
Methodology: VC_LEVEL - Looks at each sample buffer
sequentially. If there are voise attributes
in the buffer, the routine looks at the
next. The routine returns an indication of
the amount of voice in all 3. All three
must have some voice indication. Routines
calling VC_LEVEL usually judge a return
value of 9 or greater to indicate voice is
present.
Input r1 - number of buffers to test (1-3)
r6 - pointer to first buffer
Return r1 - number 0-12 of voice in three sample
buffers
VC_NOISE - If the peak/average indicators
list this as single tone, dual tone or a
multitone "1" (very high multitone), the
routine classifies the sound as noise.
Otherwise, the routine looks at the second
buffer. This 15 millisecond discriminator
sees this buffer as voice and the routine
looks at the first buffer. If this buffer
is also voice, then the routine returns
voice. Otherwise, the routine looks at the
third buffer. If this buffer is voice, then
the routine returns voice. Otherwise, the -continued routine returns noise. The routine returns
two types of noise indicators for further
evaluations. The first type is returned if
the peak/average is not at the proper level.
The second type is returned if the routine
fails to find two sequential buffers with
voice attributes.
Input: pptr - pointer to buffer information for
buffer first in stack (−4).
class - class if first buffer. Second on
stack (−8).
Output: r1 - L4_VOICE if voice.
L4_NOISE3 if no voice judged on first
criteria.
L4_NOISE1 if no voice judged on second
criteria.
CP_VCN15 Fifteen Millisecond Voice Processing
Voice noise testing on the 15 millisecond
buffer.
Goal: Return an indicator that the sample period
exhibits voice or noise properties.
The 15 millisecond voice noise routine works
by basis of elimination rather than basis of
determining voice. It looks at several
indicators to determine if they have noise
attributes rather than looking for
indicators that determine voice. If, by
process of elimination, these noise
indicators are there, we return it as noise,
otherwise we return it as voice. Therefore,
we look at certain energy buckets, to see if
there is a large spread above 3,000hz. We
know that voice does not give that
attribute, so we return it as a 0, which
means that it is definitely not a voice. If
we look at the peak max of the buckets, and
see that it is extremely constant and is not
changing very much, or we have a low
indicator of .4, then we know that it cannot
be a voice. If it has slightly more
attributes than the above ones, we return a
1. We then look for the peak average again
and the peak maxes and make sure that we do
not have anything that we disagree on as
being voice attributes. Very high peak
averages are not indicative of voice, nor is
a peak max being extremely low. So we
return a 2. If we cannot find any of those
criteria, then we assume it is a voice, and
we return a 4.
Methodology: The routine uses several indicators to judge
the properties of the sample buffer. The
routine returns a value 0-4 based on the
voice noise indications.
First the routine looks at the maximum
change to peak change indicator. If this
indicator is very high (>.8) or very low
(0), the routine returns a 0.
After the initial screening the routine
performs a 64 point FFT on the data.
The routine looks at each fft bin and
calculates:
The total power in the fft where:
 * The power < 250hz
 * The power < 1000hz
 * The power < 2000hz
 * The power < 3000hz
 * The total power in the peak bin
  (maxp1)
 * The total power in the second to
  peak bin (maxp2)
The routine returns a 0 if:
 * The peak/max for the bucket is
  greater than .8
 * The energy below 3000 hz is less
  than 80% of total energy.
 * The energy below 2000 hz is less
  than 20% of total energy.
 * The total energy in the two
  maximum bins is less than 20% of the
  total energy.
 * The total energy in the two maximum bins is greater than 90% of the total energy.
* The energy below 250 hz is greater than 20% of total energy.

The routine returns a 1 if:
* The peak/max for the bucket is greater than .4 or the energy below 2000 hz is less than 50% of total energy.

The routine returns a 2 if:
* The peak/average for the bucket is greater than 15 or the peak/max for the bucket is less than .03 or the total energy in the two maximum bins is less than 40% of the total energy.

Otherwise, the routine returns a 4.0.
If the routine does not return a 0, 1 or 2, then the routine returns a 4, meaning a high probability of voice exists.

CP_LAY4 Process Layer 4
Goals: Layer four is the master controller of call progress. Layer 4 charts the current state of the call and any deviation from that state. The primary goal is to determine when a call has been answered or when the call type is known. Layer 4 then reports this information to CP_MAIN. Layer 4 only processes information during transitions. Part of CP_MAIN works in conjunction with layer 4, changing layer 4 states based on time not transitions.

Methodology: Layer 4 calls the cadence routine to determine if the signal is in cadence and if so, whether cadence responds with the current cadence state. If a cadence has been identified, such as a ringback cadence, or busy signal, cadence reports that information to layer 4.
Layer 4 evaluates the return from cadence. If the return determines the call type such as a busy signal, layer 4 reports the new status and terminates call processing. Otherwise, layer 4 continues to process the transition.
Layer 4 is a state machine and performs its actions based on its current state.
Time SIT Tone, check states. If silence occurs before done, return to L4_RB state.
If time in any one tone exceeds 675 milliseconds, return modem. Otherwise check the SIT level.
If level 0 - return to normal processing.
If level 1 - check for transition to sit.
If level 2 if transition there, store sit 1 time and set sit level to 2.
If drop, return to normal processing.
If level 2 - check transition to sit.
If level 3 if transition there, store sit 2 times and set sit level to 3.
If drop, return to normal processing.
If in level 3 - if time is greater than 2 periods, declare SIT otherwise if drop, declare modem.
_Modem: If in modem for over 450 milliseconds, declare a modem, otherwise, change back to ringback mode.

Normal Processing State
If a noise or machine generated tone, test if SIT. If it is SIT, change to SIT mode. Otherwise, if single or dual tone, change to modem mode. If transition type is voice declare voice unless:
1) we are in the acquire ringback state and the previous transition was a click; or
2) we are in the sound section of the ringback; or
3) we are in the silence buffer of a ringback and the last transition was within 195 milliseconds and was a noise;

Output: l4result - result of call disposition
l4state - state of layer 4
l3state - state of layer 3 (modified when layer 4 must change 3 operation).

Figure 4:
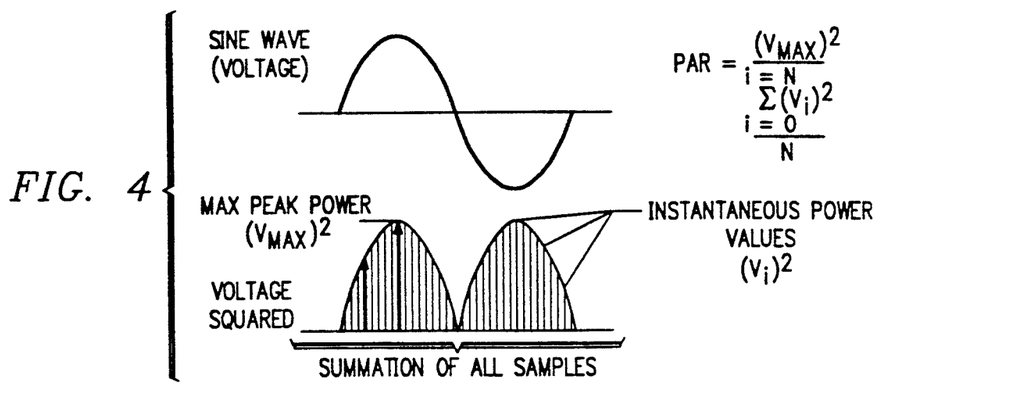
FIG. 4 shows a graph of peak power, and the results of power summation.

Result Codes:
The following is a list of the result codes returned by the call progress routine.
Ring no answer
Line busy
Reorder
Answering machine (not implemented yet)
Live person answered
Modem/fax, and pager terminal
Unknown cadence
Pre first ringback time-out
Post ringback time-out
Intercept SIT tone
Reorder SIT tone
Vacant code SIT tone
No circuit SIT tone
First ringback FIG. 4 shows how to compute the peak average ratio (PAR). The peak average is the maximum voltage squared divided by the average power (the sum of all voltage samples squared divided by the number of samples) or:

$$PAR = \frac{(V\max)^2}{\frac{\sum_{i=o}^{N}(V_i)^2}{N}}$$

PAR equals 2 for a sine wave. Two tones superimposed on each other produces a par of 4.

It should be noted that the specific number of samples processed, the periodic sample rate and other timing specified are examples and other intervals may be chosen. This also applies to all frequency bands used in the examples.

Although this description describes the invention with reference to the above specified embodiments, it is but one example, and the claims, not this description, limit the scope of the invention. Various modifications of the disclosed embodiment, as well as alternative embodiments of the invention, will become apparent to persons skilled in the art upon reference to the above description. Therefore, the appended claims will cover such modifications that fall within the true scope of the invention.

What is claimed is:

1. A method of determining telephone line status comprising the steps of:
monitoring audio signals on the line to determine a transition from one line state to another;
said monitoring step including the step of calculating a first ratio level between a peak instantaneous power level of said audio signals and an average power level of said audio signals, and a second ratio level between said peak instantaneous power level of said audio signals and a maximum power level of said audio signals; and
comparing said first and second ratio levels to a set of criteria to determine said telephone line status, 2. The method set forth in claim 1 wherein based upon a determined line state transition, there follows the step of:
determining if the transition is to a voice mode by a called party.

3. The method set forth in claim 2 wherein said determining step includes the step of:
   timing the power ratio level for a period of time; and
   returning a signal if the power ratio level is unchanged for said period of time.

4. The method set forth in claim 2 wherein said determining step includes the step of:
   ascertaining if the determined transition is a click or silence.

5. The method set forth in claim 4 wherein said ascertaining step includes the step of:
   comparing peak to average power ratio levels at spaced apart intervals.

6. The method set forth in claim 5 wherein said ascertaining step further includes:
   comparing peak power against maximum change in power with respect to time.

7. The method set forth in claim 1 wherein said monitoring step further includes the step of:
   establishing sliding windows of time increments; and
   measuring the ratio levels from different windows on a look-ahead basis.

8. The method set forth in claim 7 wherein said calculating step further includes the steps of:
   storing calculated ratio levels from different time increments;
   looking backward to at least one time increment to determine an end of a signal period; and
   looking forward at least one time increment to determine a beginning of a signal period.

9. The method set forth in claim 8 wherein at a given point in time power ratio levels from n different time increments are stored; and
   wherein said looking steps each include looking at the power ratio levels stored in less than n of said increments.

10. The method set forth in claim 9 wherein n=5.

11. The method set for in claim 1 wherein said monitoring step includes the step of comparing a density change between subsequently calculated ratio levels between said peak instantaneous power level and said average power level of said audio signals.

12. The method set forth in claim 11 wherein said comparing step includes:
    establishing buffers for different contiguous periods of time, each buffer storing peak to average power ratio levels for one period of time;
    for any one instant of time, examining the power ratio levels of:
      the preceding one buffer;
      the preceding two buffers; and
      the preceding three buffers so as to establish a first set of three indicators, and
    for the same one instant of time, examining the power ratio levels of:
      the following one buffer;
      the following two buffers; and
      the following three buffers so as to establish a second set of three indicators; and comparing the three indicators from either said first or said second set of indicators.

13. The method set forth in claim 12 wherein a transition is detected if the compared indicators in either the first or second set move in a particular order.

14. A telephone cell placement system comprising:
    a processor for identifying calls to be placed on a statistical basis;
    a plurality of attendants for handling calls placed by said processor;
    a switching network operable in response to calls identified for establishing a call in connection to called lines in response to said processor; and
    a call progress detector connectable via said network to calling ones of said lines for controlling connection through said network to idle ones of said attendants, said detector including:
    means for calculating a first ratio level between a peak instantaneous power level of audio signals on said lines and an average power level of said audio signals, and a second ratio level between said peak instantaneous power level of said audio signals and a maximum power level of said audio signals on said lines to determine transitions from one line state to another.

15. The system set forth in claim 14 further comprising:
    means enabled by a determined line state transition then determining if the transition is to a voice mode by a called party.

16. The system set forth in claim 14 wherein said calculating means further includes:
    means for establishing sliding windows of time increments; and
    means for measuring the power ratio levels from different windows on a look-ahead basis.

17. The system set forth in claim 14 wherein said determining means includes:
    means for timing the power ratio level for a period of time; and
    means for returning a signal if the power ratio level is unchanged for said period of time.

18. The system set forth in claim 14 wherein said calculating means further includes:
    means for storing calculated power ratio levels from different time increments;
    means for looking backward to at least one time increment to determine an end of a signal period; and
    means for looking forward at least one time increment to determine a beginning of a signal period.

19. The system set forth in claim 18 wherein at a given point in time power ratio levels from n different time increments are stored; and
    wherein said looking means each include looking at the power levels stored in less than n of said increments.

20. The system set forth in claim 19 wherein n=5.

21. The system set forth in claim 14 wherein said calculating means includes:
    means for comparing a density change between subsequently calculated peak to average power ratio levels.

22. The system set forth in claim 21 wherein said comparing means includes:
    buffers for different contiguous periods of time, each buffer storing peak to average power ratio levels for one period of time;
    means operable at any one instant of time for examining the power ratio levels of:
      the preceding one buffer;
      the preceding two buffers; and
      the preceding three buffers so as to establish a first set of three indicators, and
    for the same one instant of time,
      means operable for examining the power ratio levels of:

the following one buffer;
the following two buffers; and
the following three buffers so as to establish a second set of three indicators, and comparing the three indicators from either said first or said second set of indicators.

23. The system set forth in claim 22 further including:
means for detecting a transition if the compared indicators in either the first or second set move in a particular order.

24. The system set forth in claim 14 wherein said calculating means includes:
means for ascertaining if the determined transition is a click or silence.

25. The system set forth in claim 24 wherein said ascertaining means includes:
means for comparing peak to average power ratio levels at spaced apart intervals.

26. The system set forth in claim 25 wherein said ascertaining means further includes:
means for comparing peak power against maximum change in power with respect to time.

27. A system for determining telephone line status comprising:
means for monitoring audio signals on the line to determine transitions from one line state to another;
wherein said monitoring means includes means for calculating a first ratio level between a peak instantaneous power level of said audio signals and an average power level of said audio signals, and a second ratio level between said peak instantaneous power level of said audio signals and a maximum power level of said audio signals; and
means for comparing said first and second ratio levels to a set of criteria to determine said telephone line status, 28. The system set forth in claim 27 wherein said monitoring means further includes:
means for establishing sliding windows of time increments; and
means for measuring the power ratio levels from different windows on a look-ahead basis.

29. The system set forth in claim 28 wherein said calculating means further includes:
means for storing calculated power ratio levels from different time increments;
means for looking backward to at least one time increment to determine an end of a signal period; and
means for looking forward at least one time increment to determine a beginning of a signal period.

30. The system set forth in claim 27 further comprising:
means enabled by a determined line state transition for determining if the transition is to a voice mode by a called party.

31. The system set forth in claim 30 wherein said determining means includes:
means for timing the power ratio level for a period of time; and
means for returning a signal if the power ratio level is unchanged for said period of time.

32. The system set forth in claim 30 wherein said determining means includes:
means for ascertaining if the determined transition is a click or silence.

33. The system set forth in claim 32 wherein said ascertaining means includes:

means for comparing peak to average power ratio levels at spaced apart intervals.

34. The system set forth in claim 33 wherein said ascertaining means further includes:
means for comparing peak power against maximum change in power with respect to time.

35. The system set forth in claim 27 wherein said monitoring means includes:
means for comparing a density change between subsequently calculated peak to average power ratio levels.

36. The system set forth in claim 35 wherein said comparing means includes:
buffers for different contiguous periods of time, each buffer storing peak to average power ratio levels for one period of time;
means operable at any one instant of time for examining the power ratio levels of:
the preceding one buffer;
the preceding two buffers; and
the preceding three buffers so as to establish a first set of three indicators, and
for the same one instant of time,
means operable for examining the power ratio levels of:
the following one buffer;
the following two buffers; and
the following three buffers so as to establish a second set of three indicators, and comparing the three indicators from either said first or said second set of indicators.

37. The system set forth in claim 36 further including:
means for detecting a transition if the compared indicators in either the first or second set move in a particular order.

38. A circuit for determining telephone line status comprising:
means for monitoring audio signals on said line to determine a transition from one line state to another;
said monitoring means including means for calculating a first ratio level between a peak instantaneous power level of said audio signals and an average power level of said audio signals, and a second ratio level between said peak instantaneous power level of said audio signals and a maximum power level of said audio signals; and
means for comparing said first and second ratio levels to a set of criteria to determine said telephone line status, 39. The circuit as set forth in claim 38 further comprising:
means for determining if the transition is to a voice mode by a called party based upon a determined line state transition.

40. The circuit as set forth in claim 39 wherein said determining means includes:
means for timing the power ratio level for a period of time; and
means for returning a signal if the power ratio level is unchanged for said period of time.

41. The circuit as set forth in claim 39 wherein said determining means includes:
means for ascertaining if the determined transition is a click or silence.

42. The circuit as set forth in claim 41 wherein said ascertaining means includes:

means for comparing peak to average power ratio levels at spaced intervals.

43. The circuit as set forth in claim 42 wherein said ascertaining means further includes:
   means for comparing peak power against maximum change in power with respect to time.

44. The circuit as set forth in claim 38 wherein said monitoring means further includes:
   means for establishing sliding windows of time increments; and
   means for measuring the power ratio levels from different windows on a look-ahead basis.

45. The circuit as set forth in claim 44 wherein said calculating means further includes:
   means for storing calculated power ratio levels from different time increments;
   means for looking backward at least one time increment to determine an end of a signal; and
   means for looking forward at least one time increment to determine a beginning of a signal.

46. The circuit as set forth in claim 44 wherein at a given point in time power ratio levels from n different time increments are stored, and
   wherein said looking means each include means for looking at the power ratio levels stored in less than n of said increments.

47. The circuit as set forth in claim 46 wherein n=5.

48. The circuit as set forth in claim 38 wherein said monitoring means includes:
   means for comparing a density change between subsequently calculated peak to average power ratio levels.

49. The circuit as set forth in claim 48 wherein said comparing means includes:
   means for establishing buffers for different contiguous periods of time, each buffer storing peak to average power ratio levels for one period of time;
   for any one instant of time, means for examining the power ratio levels of:
      the preceding one buffer;
      the preceding two buffers; and
      the preceding three buffers so as to establish a first set of three indicators, and
   for the same one instant of time, means for examining the power ratio levels of:
      the following one buffer;
      the following two buffers; and
      the following three buffers so as to establish a second set of three indicators; and
   means for comparing the three indicators from either said first or said second set of indicators.

50. The circuit as set forth in claim 49 wherein a transition is detected if the compared indicators in either the first or second set move in a particular order.

51. A circuit for determining call progress in a communications system, said circuit comprising:
   means for monitoring call progress audio signals on a telephone line;
   means for recording power levels of said monitored call progress audio signals;
   means for calculating a first ratio level between a peak instantaneous power level of said audio signals and an average power level of said call progress audio signals, and a second ratio level between said peak instantaneous power level of said audio signals and a maximum power level of said call progress audio signals; and
   means for determining transitions from one line state to another by evaluating said recorded and calculated power levels of said monitored call progress audio signals.

52. The circuit as set forth in claim 51 further comprising:
   means for comparing said recorded power ratio levels against a present power ratio level to provide an added indication of call progress signals on said line.

53. The circuit as set forth in claim 51 further comprising;
   means for identifying call progress signal types by evaluating said determined transitions.

54. The circuit as set forth in claim 53 further comprising:
   means for determining the status of any call based upon said identification of said call progress signal types.

55. The circuit as set forth in claim 54 wherein said determining means includes:
   means for separating out those call progress signals not having relatively constant power levels and a relatively constant number of frequencies within a frequency spectrum.

56. The circuit as set forth in claim 55 wherein said determining means further includes:
   means for further separating those separated call progress tones having an average energy level above a certain threshold.

57. The circuit as set forth in claim 55 wherein said determining means further includes:
   means for further separating those separated call progress tones having a constant peak to maximum value.

58. The circuit as set forth in claim 55 wherein said determining means further includes:
   means for further separating those separated call progress tones having peak averages higher than a first value and lower than a second value.

* * * * *